United States Patent
Jam et al.

(10) Patent No.: US 7,880,590 B2
(45) Date of Patent: Feb. 1, 2011

(54) METHOD AND APPARATUS FOR LOCALIZATION OF CONFIGURABLE DEVICES

(75) Inventors: Mehrban Jam, Palo Alto, CA (US); Salil Pradhan, Palo Alto, CA (US); Cyril Brignone, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1076 days.

(21) Appl. No.: 11/488,489

(22) Filed: Jul. 18, 2006

(65) Prior Publication Data

US 2008/0068139 A1   Mar. 20, 2008

(51) Int. Cl.
*H04Q 5/22* (2006.01)

(52) U.S. Cl. ............ 340/10.51; 704/8; 715/703

(58) Field of Classification Search ........ 340/10.1, 340/10, 51; 704/8; 715/703, 744, 746, 866
See application file for complete search history.

(56) References Cited

U.S. PATENT DOCUMENTS

| | | | |
|---|---|---|---|
| 5,488,223 A | 1/1996 | Austin et al. | |
| 5,517,194 A | 5/1996 | Carroll et al. | |
| 5,562,621 A | 10/1996 | Claude et al. | |
| 5,774,876 A | 6/1998 | Woolley et al. | |
| 5,949,335 A | 9/1999 | Maynard | |
| 5,959,529 A | 9/1999 | Kail, IV | |
| 6,046,676 A | 4/2000 | Ward et al. | |
| 6,177,860 B1 | 1/2001 | Cromer et al. | |
| 6,488,153 B1 | 12/2002 | Morris | |
| 6,496,793 B1 | 12/2002 | Veditz et al. | |
| 6,720,866 B1 | 4/2004 | Sorrells et al. | |
| 6,769,604 B2 | 8/2004 | Ichikawa et al. | |
| 6,795,935 B1 | 9/2004 | Unkle et al. | |
| 6,802,659 B2 | 10/2004 | Cremon et al. | |
| 6,808,255 B1 | 10/2004 | Haines et al. | |
| 6,885,288 B2 | 4/2005 | Pincus | |
| 6,876,295 B1 | 5/2005 | Lewis | |
| 6,938,976 B2 | 9/2005 | Siwinski et al. | |
| 7,267,269 B2 | 9/2007 | Kikuchi | |
| 7,289,027 B2 | 10/2007 | Hunt et al. | |
| 7,304,573 B2 | 12/2007 | Postma | |
| 7,307,534 B2 | 12/2007 | Pesavento | |
| 7,363,586 B1 * | 4/2008 | Briggs et al. ............. 715/736 |
| 7,379,799 B2 | 5/2008 | Cleary et al. | |
| 7,511,848 B2 | 3/2009 | Crosier et al. | |
| 2002/0140966 A1 | 10/2002 | Meade et al. | |
| 2002/0191998 A1 | 12/2002 | Cremon et al. | |
| 2003/0009323 A1 | 1/2003 | Adeli | |
| 2003/0023517 A1 | 1/2003 | Marsh et al. | |

(Continued)

*Primary Examiner*—Thomas J Mullen

(57) ABSTRACT

A localization method for setting the locale of a configurable device is presented. The first portion of the localization transmits localization selections for a target locale to a configurable device. Localization selections are initially set on an interrogator device and then transmitted wirelessly using RFID or other technologies from the interrogator device to a tag coupled to the configurable device. A second portion of the localization receives localization selections for a target locale on the configurable device. A tag receives from an interrogator device one or more localization selections for the target locale on the configurable device. These localization selections are stored on the tag until the configurable device is powered-on. Device initialization causes another portion of the localization to set a target locale on a configurable device. Firmware accesses localization selections previously stored on the tag and then sets the default localization selections in the firmware for the device.

16 Claims, 5 Drawing Sheets

U.S. PATENT DOCUMENTS

| | | |
|---|---|---|
| 2003/0032446 A1 | 2/2003 | Pincus |
| 2003/0135246 A1 | 7/2003 | Mass et al. |
| 2003/0141985 A1 | 7/2003 | Haller et al. |
| 2003/0150908 A1 | 8/2003 | Pokorny et al. |
| 2003/0154144 A1 | 8/2003 | Pokorny et al. |
| 2003/0158795 A1 | 8/2003 | Markham et al. |
| 2005/0109829 A1 | 5/2005 | Postma |
| 2005/0158100 A1 | 7/2005 | Yamaguchi et al. |
| 2005/0237198 A1 | 10/2005 | Waldner et al. |
| 2005/0267882 A1 | 12/2005 | Aupperlee et al. |
| 2005/0280511 A1 | 12/2005 | Yokoyama et al. |
| 2006/0017962 A1 | 1/2006 | Burdette et al. |
| 2006/0002280 A1 | 2/2006 | Krishna et al. |
| 2006/0022829 A1 | 2/2006 | Pan |
| 2006/0117304 A1 | 6/2006 | Anastassopoulos et al. |
| 2006/0181395 A1 | 8/2006 | Gruszynski |
| 2006/0211494 A1 | 9/2006 | Helfer |
| 2006/0222430 A1 | 10/2006 | Duckett et al. |
| 2006/0252374 A1 | 11/2006 | Ban et al. |
| 2007/0023516 A1 | 2/2007 | Chapman et al. |
| 2007/0159779 A1 | 7/2007 | Chang |
| 2007/0270694 A1 | 11/2007 | Pelissier et al. |
| 2007/0273517 A1 | 11/2007 | Govind |
| 2008/0083824 A1 | 4/2008 | Postma |
| 2008/0114228 A1 | 5/2008 | McCluskey et al. |
| 2008/0196170 A1 | 8/2008 | Choi |

* cited by examiner

METHOD AND APPARATUS FOR LOCALIZATION OF CONFIGURABLE DEVICES

CROSS-REFERENCE TO RELATED PATENT APPLICATIONS

The present application is related to both co pending U.S. patent application Ser. No. 11/488,348 filed on the same date as the present application by Michael Scott Montgomery, Lin-Fat Chris Lee and William H. Pickel entitled CODE UPGRADE and co pending U.S. patent application Ser. No. 11/488,261 filed on the same date as the present application by Michael Scott Montgomery, Perry A. Miller and Wai Kwan Chan entitled RF TAG, the full disclosures of which are hereby incorporated by reference and assigned to the assignee of the present invention.

BACKGROUND

A great number of products are manufactured in multiple countries or localities around the world. Many times, a device is manufactured in one locality and then shipped for use in another locality. The localization configuration process tailors a device to the particular language, currency, protocol and other requirements peculiar to a specific geographic area or locale. Redeploying a device targeted for one locale to another locale due to suddenly changing market conditions may be extremely complex or impossible when the localization process is designed for only single locale.

More sophisticated localization routines can be used to target multiple locales. Localization for multiple locales embeds the localization information for all the various target locales in the device. To complete the localization process on a configurable device like this, there are two general conventional solutions. In one case, the configurable device is manufactured without any particular localization information. Instead, the localization process is applied just before the manufactured product is deployed or sold into a specific locale. This approach can be time consuming and expensive for the manufacturer as it often requires physically opening the package or containers for each product and then resealing.

Another approach makes the customer of the product responsible for performing the final localization operation. In this case, the customer changes the settings in the device to the proper locale when the product is first used. This approach works wells as long as the customer is able to use the default locale set at manufacture to make the proper changes.

Unfortunately, the default locale set during manufacture does not always provide users with adequate control to modify the locale. In some cases, the language of the default locale used to operate a menu in a device cannot be understood by the customer and changes to the locale cannot be accurately made. For example, the menu control system for a digital camera having a default locale of Japan may not be useful if redeployed to the United States unless the customer can read and understand Japanese.

Similarly, certain default localization routines may be technically too complex for users to modify. For example, there are many different standards for operating various components of a television, DVD player or videocassette recorder (VCR). The related protocols and frequencies are often complex and sometimes difficult to select properly. Depending on the locale, televisions may use either NTSC or PAL encoding and operate with different intermediate and front-end frequencies. DVD players are configured with region codes specific to a geographic region and such codes cannot readily be used with DVDs designed for use in other regions. It is not reasonable to ask the average user to modify these devices to operate using different frequencies and protocols peculiar to their specific default locale.

Indeed, there is a need to simplify the localization process for consumers as well as minimize or eliminate the requirement for manufactures to open and repackage devices if they are redeployed into different locales.

BRIEF DESCRIPTION OF THE DRAWINGS

Like reference numbers and designations in the various drawings indicate like elements.

SUMMARY OF THE INVENTION

One aspect of the present invention features a method of transmitting localization selections for a target locale to a configurable device. The initial operation begins when one or more localization selections are received on an interrogator device. The interrogator device is capable of communicating using RFID or other suitable wireless technologies to the configurable device. Accordingly, the localization settings are transmitted from the interrogator device to a tag operatively coupled to the configurable device.

Another aspect of the present invention includes a method of receiving localization selections for a target locale on the configurable device. Using RFID or other wireless technologies, a tag receives from an interrogator device one or more localization selections for setting the target locale on the configurable device. These localization selections are stored on a storage area associated with the tag until the configurable device is powered-on.

Yet another aspect of the present invention includes actually setting a target locale on a configurable device. Upon initial use, the configurable device requests initialization using one or more localization selections. Firmware accesses localization selections previously set in a storage area. The localization settings correspond to localization information transmitted from the interrogator device. Localization selections set in the storage area associated with the tag are used to then set one or more default localization selections in a firmware associated with the configurable device.

DETAILED DESCRIPTION

Implementations of the present invention transmit localization information to a tag associated with a configurable device. A relatively small amount of storage area on the tag holds the localization information until the device is first turned-on or initialized by a customer or user. During initialization, the firmware on the device reads the localization selections set in the memory of the tag and then configures the localization parameters in the firmware accordingly. The interrogator used to transmit the localization selections to the tag for each device allows the configurable device to be redeployed without opening the packaging surrounding the device. Consequently, the customer is not required to perform localization operations as the localization is done after manufacture but before delivery.

Figure 1:
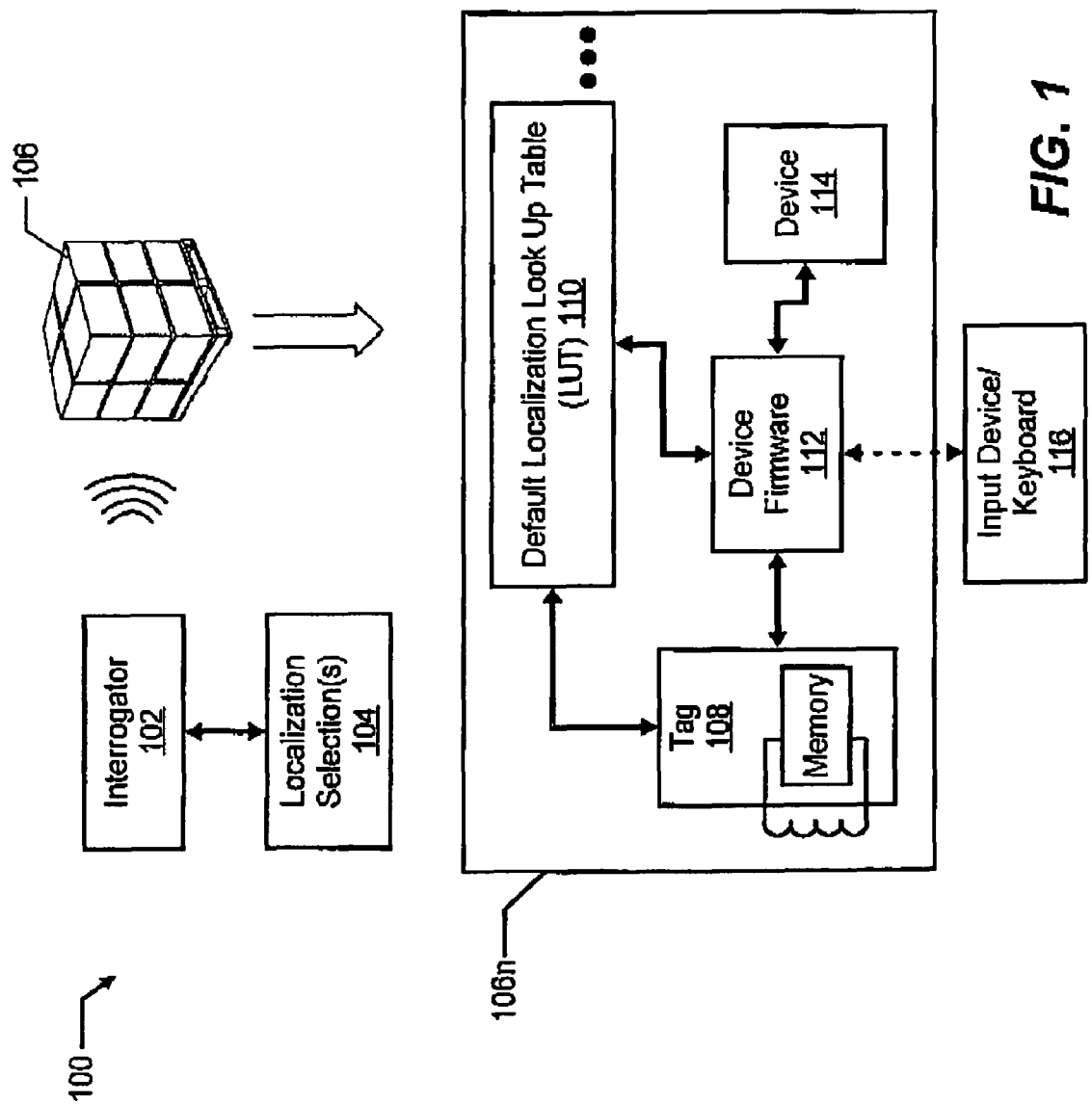
FIG. 1 is a schematic diagram of a system for localization of configurable devices using RFID technology in accordance with one implementation of the present invention.

FIG. 1 is a schematic diagram of a system 100 for localization of configurable devices 106 using RFID capable interrogators and tags. In accordance with one implementation of the present invention, system 100 includes an interrogator 102, localization selections 104 and a set of configurable devices 106. For example, the set of configurable devices 106 may be shipped together in palettes of boxes in large cargo containers. Interrogator 102 transmits localization selections 104 to one or more of the configurable devices in the set of configurable devices 106. This facilitates rapid localization and deployment of these configurable devices without significant overhead. Various methods exist for interrogator 102 to operate on many tags located on a palette or otherwise packaged in various other containers as described in U.S. patent application Ser. No. 11/284,494 entitled, "METHOD AND SYSTEM FOR ITEM TRACKING WITH TAGS" by Geoff Lyon, Salil Pradhan, Bill Serra, Alipio Caban and Jorge Badillo filed Nov. 21, 2005 assigned to the assignee of the present invention.

FIG. 1 depicts one configurable device 106n from the set of configurable devices 106 in accordance with one implementation of the present invention. In this example, configurable device 106n includes a tag 108, an optional default localization look-up-table (LUT) 110, device firmware 112, a device 114 and optionally an input device/keyboard 116. Input device/keyboard 116 illustrates a conventional approach for physically connecting to configurable device 106n and requires opening the packaging for the configurable device 106n. Nonetheless, it may be useful to keep this conventional approach for localization as a backup or in the case of an emergency.

In operation, the interrogator transmits localization selections 104 to tag 108 after manufacture and before delivery to the customer in a particular target locale. The localization selections 104 represent one set of localization selections to be set on configurable device 106n. Each of these settings are initially stored in memory on tag 108. The settings may include language, currency, frequency and protocol settings, filter values and many other necessary localization selections. Additionally, it may also be possible to include upgrades or upgrade information directly in the memory of tag 108. To reduce costs, the memory of tag 108 should only be as large as necessary for the localization and/or upgrade processes required.

Device firmware 112 references memory in tag 108 when configurable device 106n is turned on for the first time. During this initialization operation, device firmware 112 identifies the proper default locale settings for device 114. Optionally, additional localization settings in default localization LUT 110 may be indirectly referred to through an entry in memory of tag 108. For example, one entry in memory of tag 108 may simply include a country code offset that then references a set of localization selections stored in default localization LUT 110 for a particular country or region. Consequently, it may be possible to use as little as 8 or 16 bits of data in the memory of tag 108 to specify all the localization selections for configurable device 106n.

In either case, the device firmware 112 is localized with the proper settings for device 114 to operate properly for the target locale. The default setting can still be modified using conventional localization with input device/keyboard 116. It is contemplated that the manufacturer may use interrogator 102 and tag 108 to localize each configurable device 106n; however, the customer or end user may still use menus and other conventional localization techniques accessed using input device/keyboard 116. This provides a high degree of automation yet leaves the localization process flexible for the end user to control as needed.

Figure 2:
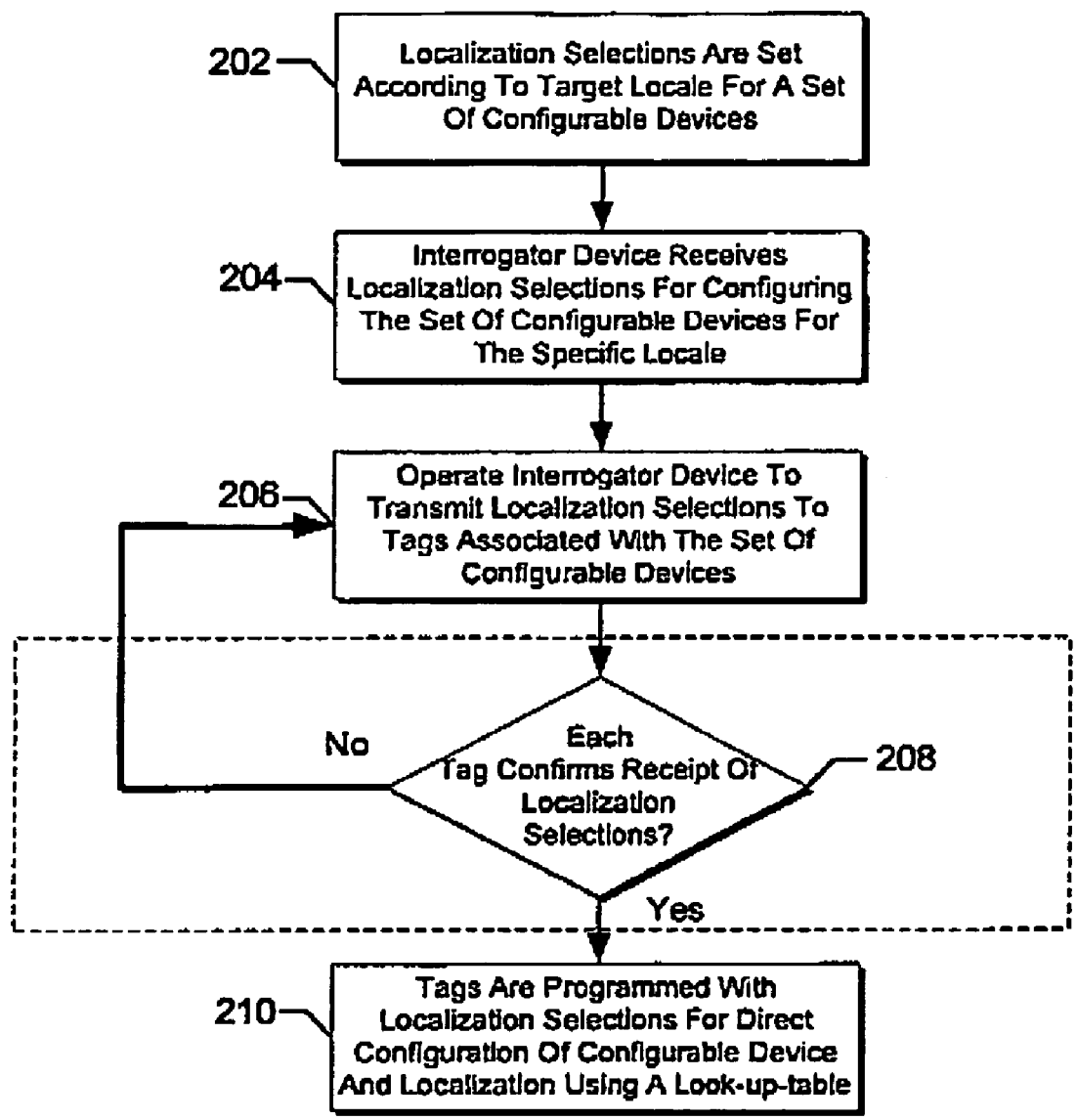
FIG. 2 is a flowchart diagram that depicts the operations for transmitting the localization selections to a configurable device in accordance with one implementation of the present invention.

FIG. 2 is a flowchart diagram depicts the operations for transmitting the localization selections to a configurable device in accordance with one implementation of the present invention. After manufacture, localization selections are set according to target locale for a set of configurable devices (202). The target locale is determined by the manufacture as soon as the destination for the configurable devices is known. The various selections for currency, language, protocols, frequencies, filters and other information can be selected and changed by the manufacturer as needed for one or multiple different configurable devices. The low overhead in changing the target locale for a configurable device can be highly automated while also leaving the packaging intact.

Next, an interrogator device receives localization selections for configuring the set of configurable devices for the specific locale (204). In one implementation, the localization selections are initially loaded in the interrogator device along with a number of the configurable devices to be configured. It is contemplated that the interrogator can be programmed with multiple different locales and then program different numbers of configurable devices with different target locales. For example, interrogator can be programmed to localize the first 500 cameras on a palette of 1000 cameras for Japan and the remaining 500 cameras on the palette for Britain.

Using the one or more target locales, operating the interrogator device transmits the localization selections to tags associated with the set of configurable devices (206). Interrogator device may impart sufficient energy during the interrogation to power the tags and store the localization selections in a storage area or memory associated with the tags. Alternatively, the tags may be actively powered using batteries and not require energy from an interrogator device to store the localization selections. As previously described, it is also possible for the interrogator device to configure a first set of configurable devices in a group with one locale and a second set of devices from the group of configurable devices with another locale.

As an added option, a tag from each configurable device may confirm receipt of the localization selections (208). Failure to receive this confirmation of receipt from each tag (208 No) may then cause the interrogator to repeat the transmission of localization selections to properly complete the transmission of localization information as required. For example, interrogator may use a counter to determine if the tag from every configurable device has received the localization selections or may use a more complex scheme involving the counter along with an identifier from each tag, a checksum, a hash or some combination thereof. The hashing may include a hashing of localization information corresponding to localization selections.

Once the transmission from the interrogator is completed, each tag is programmed with localization selections and can be used for either direct configuration of a configurable device, indirect configuration of the configurable device using a default localization LUT or any combination thereof (210).

Figure 3:
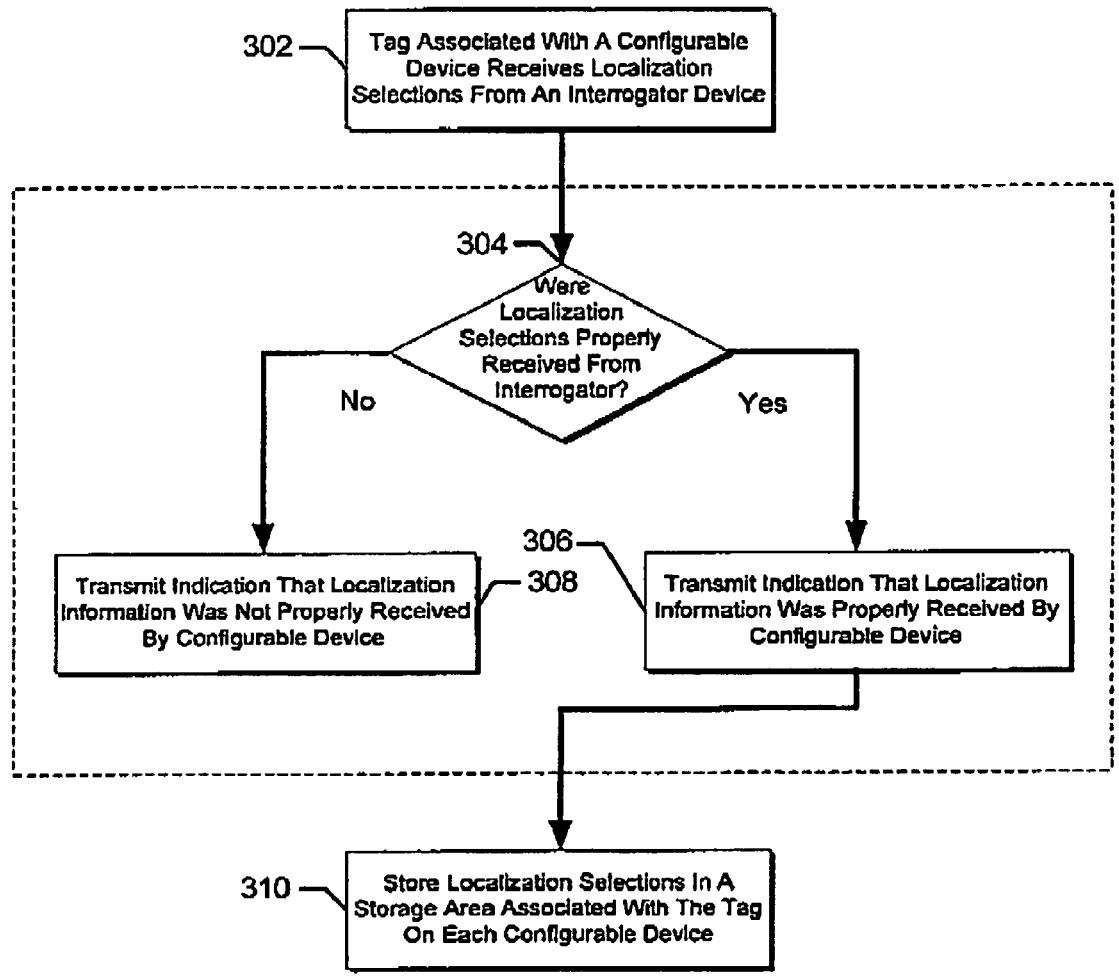
FIG. 3 is a flowchart of the operations associated with receiving localization selections for a target locale on a configurable device in accordance with one implementation of the present invention.

FIG. 3 is a flowchart of the operations associated with receiving localization selections for a target locale on a configurable device in accordance with one implementation of the present invention. In one implementation, the configurable device receives these localization selections shortly after manufacture and once the target locale for the device is determined. For example, the configurable device can include a digital camera, a video recorder/player, a DVD player or any other electronic device that uses localization selections to operate. In most cases, there are multiple configurable devices being localized; however, it is also feasible to localize a single configurable device as well using implementations of the present invention.

Initially, a tag associated with a configurable device receives localization selections from an interrogator device (302). A tag associated with the configurable device may be a passive RFID device powered through the interrogator or may be powered by a small battery sufficient to power the device from manufacture to deployment. The tag may also receive a country code or locale id from the interrogator as well as one or more localization selections. The country code or locale id can specify an entry in a default localization LUT having multiple predetermined localization selections setup as defaults for the different locales.

Optionally, each tag may determine whether the localization selections were properly received from the interrogator device (304). This step may perform a checksum or other operation to ensure that the localization selections received were not corrupted or inadvertently modified during transmission. If one or more localization selections have not been properly received then the tag will transmit an indication to the interrogator (308); the interrogator may be configured to retransmit the localization selections in response until they are successfully received by the tag. Alternatively, the tag may also transmit an indication to the interrogator that the localization selections were properly transmitted and received.

Next, the tag stores the localization selections in a storage area associated with the tag and the configurable device (310). The storage area for the tag includes sufficient memory to store one or more localization selections used for configuring the device upon initial start-up or boot. As previously described, the storage area of the tag may also be used to hold a specified locale id that references an offset into the optional default localization LUT. This locale id stored in the storage area indirectly specifies a set of predetermined localization selections stored in advance in the default localization LUT.

Figure 4:
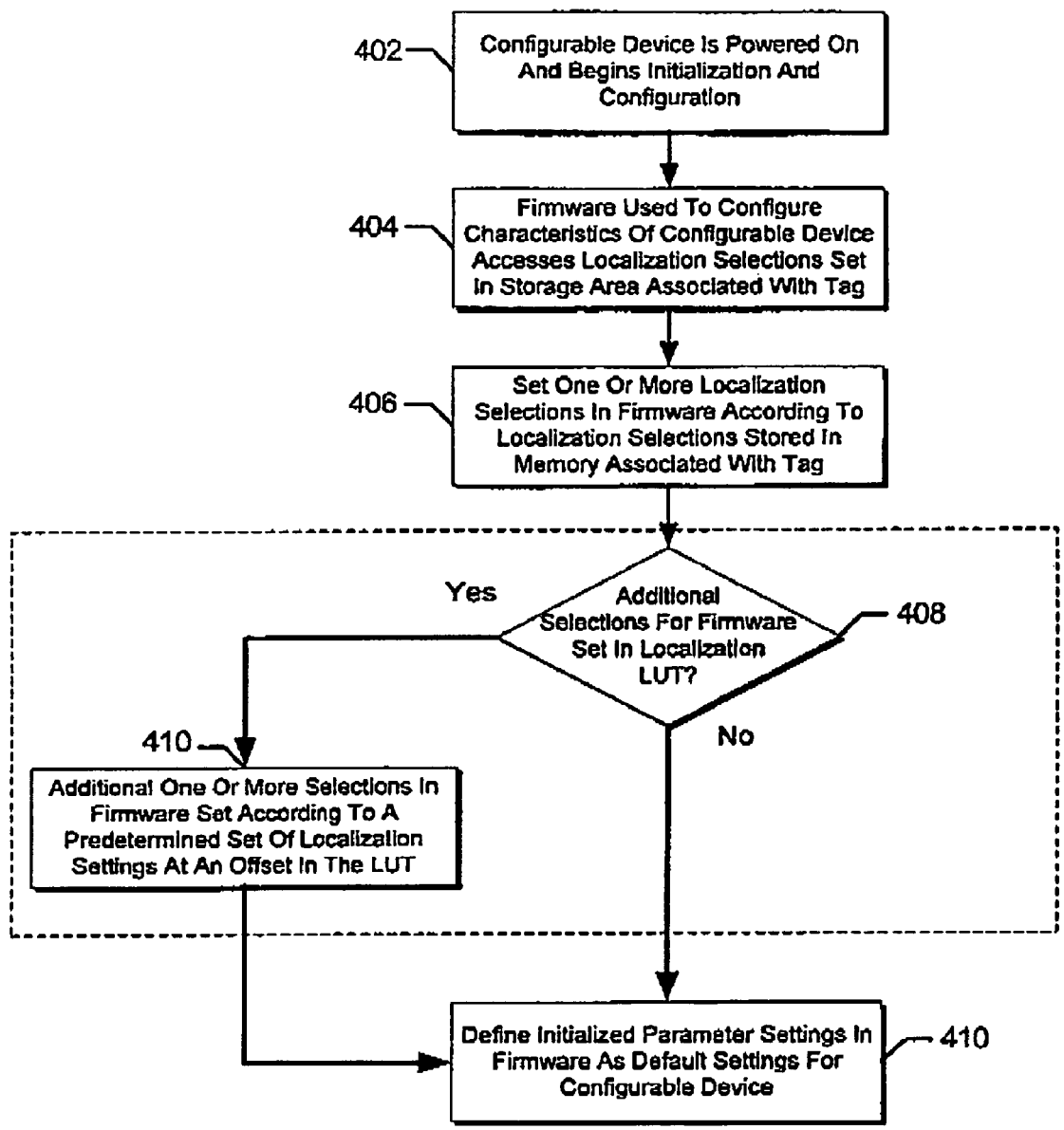
FIG. 4 is another flowchart illustrating the operations associated with setting a target locale on a configurable device in accordance with implementations of the present invention.

FIG. 4 is another flowchart illustrating the operations associated with setting a target locale on a configurable device in accordance with implementations of the present invention. Localization settings are transmitted and stored in tag memory while the device is typically powered off after manufacture and during some phase of the delivery process. Accordingly, the localization selections still need to be set as default settings in the firmware of the device. In one implementation, initialization and configuration of the configurable device begins when the device is first powered on (402). A bootstrap routine in firmware accesses localization selections set in the storage area associated with the tag to configure the default characteristics of the device (404). For example, the bootstrap routine may read a predetermined storage area in the tag for the most important localization settings needed by the device. After the values are read, the one or more localization selections are set in firmware according to the localization selections read from the storage area of the tag (406).

Optionally, the firmware may determine if additional selections for the firmware are to be found in a default localization LUT (408). If the default localization LUT is used, a predetermined set of localization settings are accessed at a specified offset and used to set an additional one or more selections in the firmware. As a result, the initialized parameter settings in firmware are defined as the default settings for the configurable device (410). For example, the default settings may be derived directly from the localization settings stored in the storage area associated with the tag and/or in combination with entries found in the default localization LUT.

Figure 5:
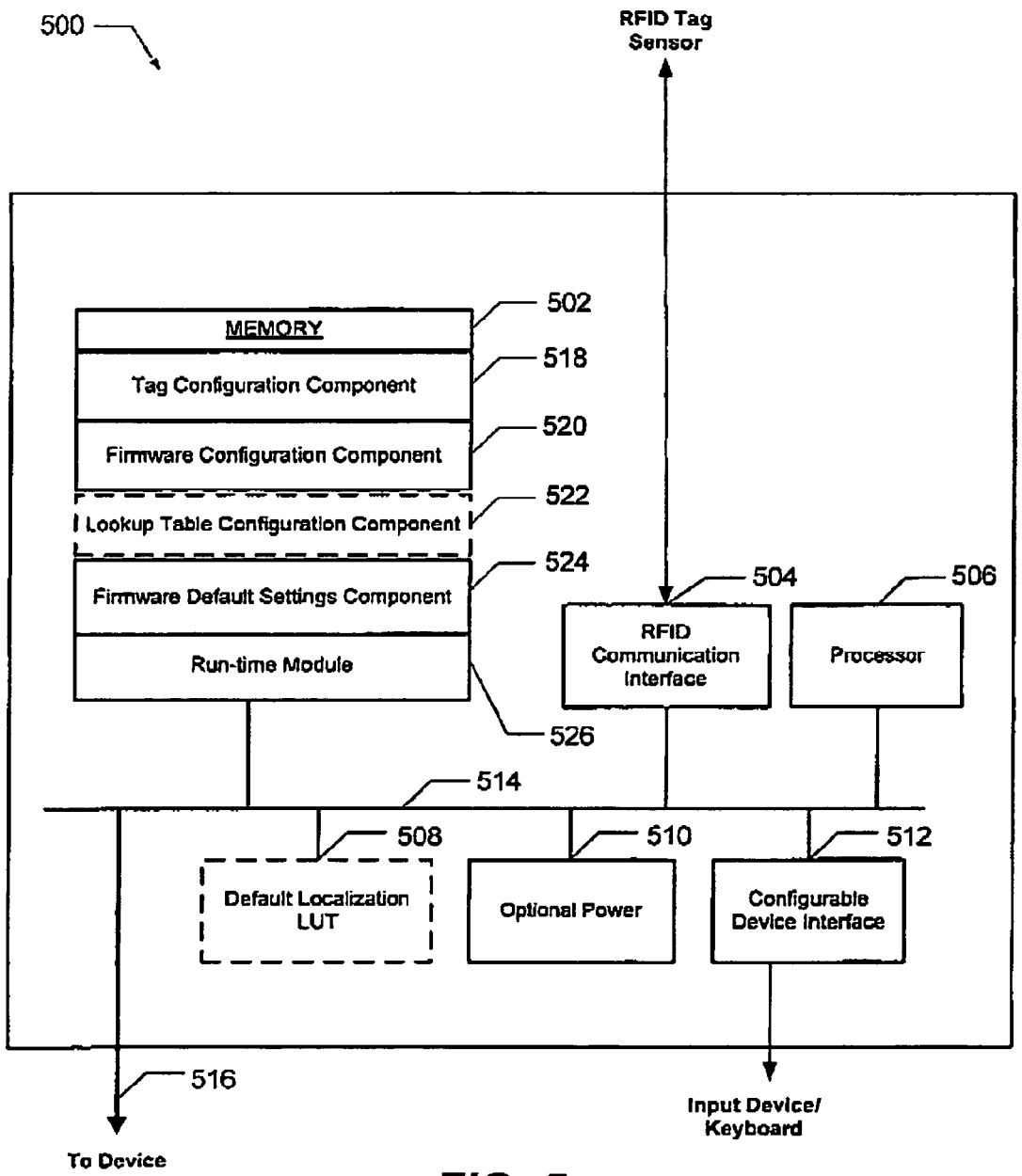
FIG. 5 is a schematic diagram of a localization system and components used in accordance with one implementation of the present invention.

FIG. 5 is a schematic diagram of a localization system 500, hereinafter system 500, and components used in accordance with one implementation of the present invention. System 500 includes a memory 502 to hold executing programs (typically random access memory (RAM) or read-only memory (ROM) such as a flash RAM), an RFID communication interface 504 capable of driving receiving from and transmitting to an RFID tag sensor. Additionally, system 500 includes a processor 506, a default localization LUT for storing many different sets of localization data, optional power 510 (e.g., a lithium button battery or printed battery) and a configurable device interface 512. For example, the configurable device interface can be used to allow conventional localization of the firmware using an input device like a keyboard or mouse. While the actual device is not illustrated, a device connection 516 facilitates the device accessing default firmware settings in system 500. One or more of the components of the system 500, including the processor 506 and the memory 502, may be used in the interrogator 102 shown in FIG. 1.

In one implementation, memory 502 includes a tag configuration component 518, a firmware configuration component 520, a lookup table configuration component 522, firmware default settings component 524 and a run-time module 526 that manages the aforementioned resources associated with system 500.

In operation, tag configuration component 518 stores the initial localization selections received from the interrogator before system 500 is powered up for the first time. Firmware configuration component 520 contains bootstrap code and other routines used to access the initial localization selections and store firmware default settings 524. Optionally, lookup table configuration component 522 facilitates accessing default localization LUT 508 containing localization information for multiple different locales. Firmware default settings component 524 stores the default settings once the localization operation has been successfully performed. In one implementation, memory 502 is implemented using non-volatile memory to ensure the firmware settings in firmware default settings component 524 are not lost or inadvertently changed.

While examples and implementations have been described, they should not serve to limit any aspect of the present invention. Accordingly, implementations of the invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of nonvolatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs.

While specific embodiments have been described herein for purposes of illustration, various modifications may be made without departing from the spirit and scope of the invention. Accordingly, the invention is not limited to the above-described implementations, but instead is defined by the appended claims in light of their full scope of equivalents.

What is claimed is:

1. A method of transmitting localization selections for a target locale to a configurable device, comprising:
    receiving one or more localization selections on an interrogator device suitable to configure the configurable device for the target locale;
    transmitting the one or more localization selections from the interrogator device to a tag operatively coupled to the configurable device, wherein the tag determines whether the one or more localization selections were properly received from the interrogator device; and
    receiving, at the interrogator device, an indication from the tag that the one or more localization selections were not properly received in response to the tag determining that the one or more localization selections were not properly received at the tag.

2. The method of claim 1 wherein the tag operatively coupled to the configurable device stores the one or more localization selections in a memory used for reference by the configurable device when it is subsequently configured to operate in the target locale.

3. The method of claim 1 wherein the interrogator device is compatible with an RFID tag having memory.

4. The method of claim 3 further comprising repeatedly transmitting the one or more localization selections from the interrogator device to the tag until the one or more localization selections are properly transmitted.

5. The method of claim 1 further comprising:
    receiving confirmation from the tag operatively coupled to the configurable device indicating receipt of the one or more transmitted localization selections.

6. The method of claim 1 wherein at least one of the one or more localization selections references a locale entry in a look-up-table (LUT) indirectly referencing one or more predetermined selections for the target locale.

7. A method of receiving localization selections for a target locale on a configurable device, comprising:
    receiving from an interrogator device one or more localization selections for the target locale on a tag associated with the configurable device;
    storing the one or more localization selections for the target locale on a storage area associated with the tag for the configurable device;
    determining, at the tag, whether the one or more localization selections for the target locale received from the interrogator device were properly received; and
    transmitting an indication that the one or more localization selections for the target locale were not properly received in response to the tag determining the one or more localization selections were not properly received.

8. The method of claim 7 further comprising,
    indicating that the localization selections for the target locale were properly received in response to the determination.

9. The method of claim 7 wherein determining whether the one or more localization selections were properly received uses a hashing of localization information corresponding to the one or more localization selections.

10. A method of setting a target locale on a configurable device, comprising:
    receiving one or more localization selections on an interrogator device suitable to configure the configurable device for the target locale;
    transmitting the one or more localization selections from the interrogator device to a tag operatively coupled to the configurable device, wherein the tag determines whether the one or more localization selections were properly received from the interrogator device;
    receiving, at the interrogator device, an indication from the tag that the one or more localization selections were not properly received in response to the tag determining that the one or more localization selections were not properly received at the tag;
    storing the one or more localization selections in a storage area associated with the tag;
    receiving a request to initialize a configurable device with the one or more localization selections of a locale;
    accessing the one or more localization selections in the tag; and
    setting the one or more localization selections in a firmware associated with the configurable device.

11. The method of claim 10 wherein the request to initialize the configurable device occurs when the configurable device is first turned on after manufacture and delivery.

12. The method of claim 10 further comprising:
    determining whether additional localization selections for the firmware are specified in a look-up-table that maps one or more locales to corresponding additional sets of localization selections; and
    setting the additional localization selections in the firmware according to the determination of whether the look-up-table has the additional sets of localization selections.

13. The method of claim 10 wherein the one or more localization selections for the locale are defined as a default setting for the configurable device.

14. An interrogator device for setting a target locale in a configurable device, comprising:
    a processor capable of executing instructions;
    a memory capable of storing instructions which when executed cause the processor to receive one or more localization selections on the interrogator device suitable to configure the configurable device for the target locale and transmit the one or more localization selections from the interrogator device to a tag operatively coupled to the configurable device, wherein the tag determines whether the one or more localization selections were properly received from the interrogator device, and at the interrogator device, receiving an indication from the tag that indicates the one or more localization selections were not properly received in response to the tag determining that the one or more localization selections were not properly received at the tag.

15. A computer program product for setting a target locale on a configurable device, tangibly stored on a computer-readable medium, comprising instructions operable to cause at least one programmable processor to:

receive one or more localization selections on an interrogator device suitable to configure the configurable device for the target locale;

transmit the one or more localization selections from the interrogator device to a tag operatively coupled to the configurable device, wherein the tag determines whether the one or more localization selections were properly received from the interrogator device;

receive, at the interrogator device, an indication from the tag that the one or more localization selections were not properly received in response to the tag determining that the one or more localization selections were not properly received at the tag;

store the one or more localization selections in a storage area associated with the tag;

receive a request to initialize a configurable device with the one or more localization selections for a locale;

access the one or more localization selections in the storage area; and set the one or more localization selections in a firmware associated with the configurable device.

16. A system for setting a target locale on a configurable device, comprising:

means for receiving one or more localization selections on an interrogator device suitable to configure the configurable device for the target locale;

means for transmitting the one or more localization selections from the interrogator device to a tag operatively coupled to the configurable device, wherein the tag determines whether the one or more localization selections were properly received from the interrogator device;

means for receiving, at the interrogator device, an indication from the tag that the one or more localization selections were not properly received in response to the tag determining that the one or more localization selections were not properly received at the tag;

means for storing the one or more localization selections in a storage area associated with the tag;

means for receiving a request to initialize a configurable device with the one or more localization selections of a locale;

means for accessing the one or more localization selections in the storage area; and means for setting the one or more localization selections in a firmware associated with the configurable device.

* * * * *

UNITED STATES PATENT AND TRADEMARK OFFICE
CERTIFICATE OF CORRECTION

| | | |
|---|---|---|
| PATENT NO. | : 7,880,590 B2 | Page 1 of 1 |
| APPLICATION NO. | : 11/488489 | |
| DATED | : February 1, 2011 | |
| INVENTOR(S) | : Mehrban Jam et al. | |

It is certified that error appears in the above-identified patent and that said Letters Patent is hereby corrected as shown below:

In column 6, line 20, delete "an" and insert -- and an --, therefor.

Signed and Sealed this
Twenty-fourth Day of April, 2012

David J. Kappos
*Director of the United States Patent and Trademark Office*